United States Patent [19]

Valls, Jr.

[11] Patent Number: 5,145,216

[45] Date of Patent: Sep. 8, 1992

[54] PIPE CONNECTION ASSEMBLY

[75] Inventor: Jose E. Valls, Jr., Ponce, P.R.

[73] Assignee: Vassallo Research and Development Corporation, Coto Laurel, P.R.

[21] Appl. No.: 734,757

[22] Filed: Jul. 23, 1991

[51] Int. Cl.$^5$ ............................................. F16L 3/04
[52] U.S. Cl. ........................................ 285/162; 5/205
[58] Field of Search ............... 285/138, 158, 162, 200, 285/205

[56] References Cited

U.S. PATENT DOCUMENTS

| | | | |
|---|---|---|---|
| 2,762,637 | 9/1956 | Rieke | 285/200 |
| 3,486,523 | 12/1969 | Mullings | 285/158 X |
| 3,490,791 | 3/1967 | Mitchell | 285/5 |
| 3,663,042 | 5/1972 | Fowler | 285/199 |
| 3,677,578 | 7/1972 | Roos | 285/162 |
| 3,819,118 | 6/1974 | Brock et al. | 239/276 |
| 3,863,960 | 2/1975 | Andersson | 285/39 |
| 3,879,069 | 4/1975 | Oostenbrink | 285/162 |
| 3,917,500 | 11/1975 | Petzetakis et al. | 156/195 |
| 3,953,555 | 4/1976 | Gley | 261/124 |
| 3,958,313 | 5/1976 | Rossborough | 29/157 R |
| 4,009,545 | 3/1977 | Rossborough | 52/173 R |
| 4,033,808 | 7/1977 | Petzetakis | 156/425 |
| 4,155,572 | 5/1979 | Bretone, Jr. | 285/197 |
| 4,232,421 | 11/1980 | Tucker | 16/2 |
| 4,365,829 | 12/1982 | Fowler | 285/162 |
| 4,494,780 | 1/1985 | Burnett | 285/177 |
| 4,550,451 | 11/1985 | Hubbard | 4/192 |
| 4,706,999 | 11/1987 | Hynes | 285/196 |
| 4,887,851 | 12/1989 | Rush | 285/200 X |
| 4,905,940 | 3/1990 | Luka | 248/56 |
| 4,966,397 | 10/1990 | McKinnon | 285/197 |
| 5,002,317 | 3/1991 | Burkit | 285/162 X |

Primary Examiner—Michael F. Trettel
Attorney, Agent, or Firm—Roylance, Abrams, Berdo & Goodman

[57] ABSTRACT

A pipe connection assembly having a branch pipe extending through an aperture in the side wall of a main, double-walled or ribbed pipe, and an elastomeric, tubular gasket positioned in the aperture of the main pipe and surrounding one end of the branch pipe for sealing between the main pipe and the branch pipe. The main pipe has inner and outer cylindrical walls concentrically connected together by at least one rib member, which forms at least one peripheral channel. The tubular gasket seals the space between the inner and outer walls for preventing fluid flowing through the pipes from leaking into the peripheral channel, or channels, of the main, double-walled pipe. The gasket is provided with an annular flange at one end for ensuring proper positioning of the gasket in the aperture of the main pipe. A pipe clamp can be used to secure the gasket to the branch pipe and to provide additional sealing. Preferably, both the main pipe and the branch pipe are composed of a suitable plastic material such as PVC.

26 Claims, 4 Drawing Sheets

PIPE CONNECTION ASSEMBLY

BACKGROUND OF THE INVENTION

1. Field of the Invention

The present invention relates to a method and apparatus for connecting a branch pipe to a main pipe. More specifically, this invention relates to tapping a branch pipe into a main, double-walled or ribbed reinforced sewer pipe and sealing the connection between the pipes by utilizing a tubular gasket therebetween. The tubular gasket not only seals between the two pipes, but also seals the space between the two walls of the double-walled pipe.

2. Description of the Prior Art

It is known to employ plastic pipes and fittings in the design and construction of underground conduit systems for conveyance of water and drainage purposes. In the past, such plastic pipes have been extruded into various lengths and diameters depending upon their use. However, extrusion of plastic pipes, such as PVC (polyvinyl chloride) pipes, have been limited in the past by diameter and weight, thus preventing competition with conventional concrete pipes for large-diameter sewer applications.

However, relatively recent advances in technology have enabled production of heavy-duty PVC pipes with bores up to 60 inches in diameter and larger, which is large enough to compete with concrete pipes. For example, systems for producing large-diameter, hollow profile pipes are described in U.S. Pat. Nos. 3,917,500 to Petzetakis and 4,033,808 to Petzetakis involving spiral winding and infrared welding of an extruded, hollow, core profile pipe.

While this hollow form of pipe has many advantages including production of heavy-duty PVC pipe with very large bores, it also has some disadvantages. A particular problem encountered with this form of pipe is the extruded, hollow core profile produces spiral and helical channels in which internal fluid can leak into, and then exit out the end of the pipe via the channels. This problem is enhanced by tapping a branch pipe into the side wall of the double-walled pipe.

In particular, when tapping a branch pipe into the side wall of a double-walled pipe, a plurality of helical or spiral channels will be intersected upon cutting the aperture into the side wall of the main pipe for receiving the branch pipe therein. This creates the problem of fluid leaking into the channels. Thus, not only must a seal between the two pipe be provided, but also each of the channels has to be sealed to prevent fluid from leaking into the channels.

The most popular type of sewer tapping system is a saddle tap. Examples of sewer saddle taps are disclosed in U.S. Pat. Nos. 3,663,042 to Fowler; 4,494,780 to Burnett; and 4,966,397 to McKinnon, which are all hereby incorporated herein by reference. Although, these saddle taps perform quite well on single walled pipe, they do not perform as well on double-walled pipe. In particular, a saddle tap does not provide any sealing of the channels intersecting with the aperture in the double-walled pipe. Moreover, saddle taps are difficult to install on existing pipe in the ground since an entire section of the pipe must be uncovered to attach the straps of the saddle tap around the main pipe.

Numerous other pipe connection assemblies or sewer taps are known in the prior art. However, none of these prior pipe connection assemblies or sewer taps recognize or address the problem of fluid leaking into the channels of a double-walled pipe. Moreover, many of these prior pipe connection assemblies are difficult to install and expensive to manufacture. For example, U.S. Pat. No. 4,365,829 to Fowler discloses a sewer tapping apparatus for connecting a branch pipe to a single walled main pipe composed of concrete.

Examples of other pipe connection assemblies are Mitchell; 3,677,578 to Roos; 3,819,118 to Brock et al; 3,863,960 to Anderson; 3,879,069 to Oostenbrink; 3,958,313 to Rossborough; 3,953,555 to Gley; 4,009,545 to Rossborough; 4,155,572 to Bertone, Jr.; 4,232,421 to Tucker; 4,550,451 to Hubbard; 4,706,999 to Hynes; and 4,905,940 to Luka.

SUMMARY OF THE INVENTION

Surprisingly, it has now been found that a branch pipe can be tapped into or connected to the side wall of a main, double-walled pipe and sealed by a gasket which not only effectively seals the connection between the branch pipe and the main pipe, but also seals the openings in the channels of the double-walled pipe which intersect with the aperture receiving the branch pipe.

The pipe connection assembly of the present invention comprises a first double-walled pipe, an elastomeric gasket and a second pipe. The first pipe has an inner cylindrical wall, an outer cylindrical wall, rib members for concentrically connecting the inner and outer walls together about a first longitudinal axis, and an aperture with an inner diameter extending through the inner and outer walls. The inner and outer walls and the rib members define at least one peripheral channel. The elastomeric gasket has a substantially cylindrical body, a first end, a second end, a predetermined inner diameter and a predetermined outer diameter. The first end of the gasket is positioned in the aperture. The second pipe has a substantially cylindrical side wall with an outer diameter slightly larger than the inner diameter of the aperture minus the thickness of the cylindrical body of the gasket. The second pipe is positioned in the gasket to compress the gasket against the inner and outer walls defining the aperture for sealing between the first and second pipes and the peripheral channel intersecting the aperture.

The gasket of the present invention, preferably has a first annular flange located adjacent the first end of the gasket, which is received in the aperture of the main pipe. The first annular flange serves to locate and correctly position the gasket in the aperture of the main pipe and to compress the first end of the basket radially, inwardly upon insertion of the gasket into the aperture of the main pipe. More specifically, the annular flange has an annular sloping surface extending outwardly from the outer surface of the gasket, and inclined away from the first end of the gasket for engaging the edge of the aperture to radially compress the first end of the gasket. An annular abutment surface is provided on the annular flange for engaging the inner surface of the main pipe for correctly positioning or locating the gasket in the aperture of the main pipe.

Once the gasket is correctly positioned in the aperture of the main pipe, the branch pipe is inserted or driven into the bore of the tubular gasket, thereby expanding the gasket outwardly against the edge of the aperture. Thus, driving the branch pipe into the gasket squeezes or compresses the rubber against the inside edge of the aperture to form a tight seal between the main pipe and the aperture. Also, the openings in the channels, formed by the walls and the rib members of the main pipe, intersecting with the aperture are tightly sealed by the gasket.

A pipe or band clamp can be provided around the second end of the gasket and the branch pipe to securely connect the branch pipe to the main pipe via the gasket. Thus, the branch pipe is prevented from being pulled out of the aperture by the settling of the earth or the shifting of the branch pipe. The pipe clamp also provides additional sealing between the inner surface of the gasket and the outer surface of the branch pipe.

The gasket also can be provided with an annular recess for receiving the pipe clamp.

Other advantages and salient features of the present invention will become apparent from the following detailed description, which, taken in conjunction with the annexed drawings discloses several preferred embodiments of the present invention.

DESCRIPTION OF THE PREFERRED EMBODIMENT

Figure 1:
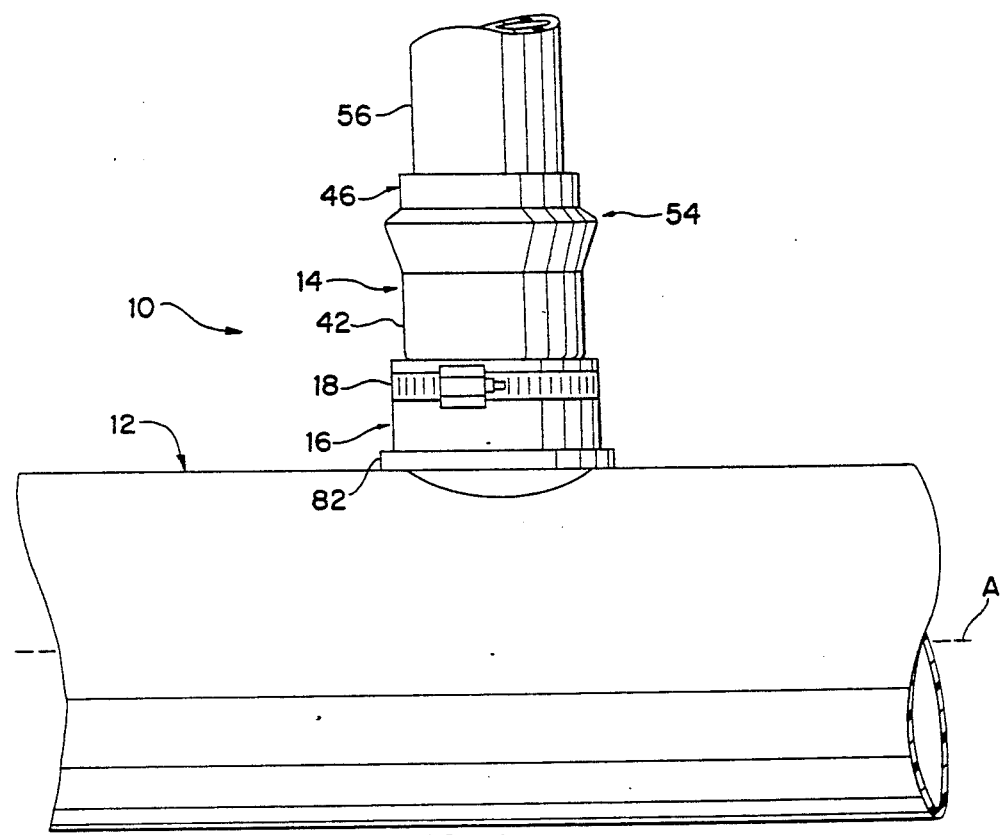
FIG. 1 is a partial, elevational view of a first embodiment of a pipe connection assembly in accordance with the present invention illustrating a branch pipe connected to a main pipe at a 90° angle.

Although specific terms are used in the following description for the sake of clarity, these terms are intended to refer only to the particular structure of the invention selected for illustration in the drawing and are invention selected for illustration in the drawing and are not intended to define or limit the scope of the invention.

Figure 2:
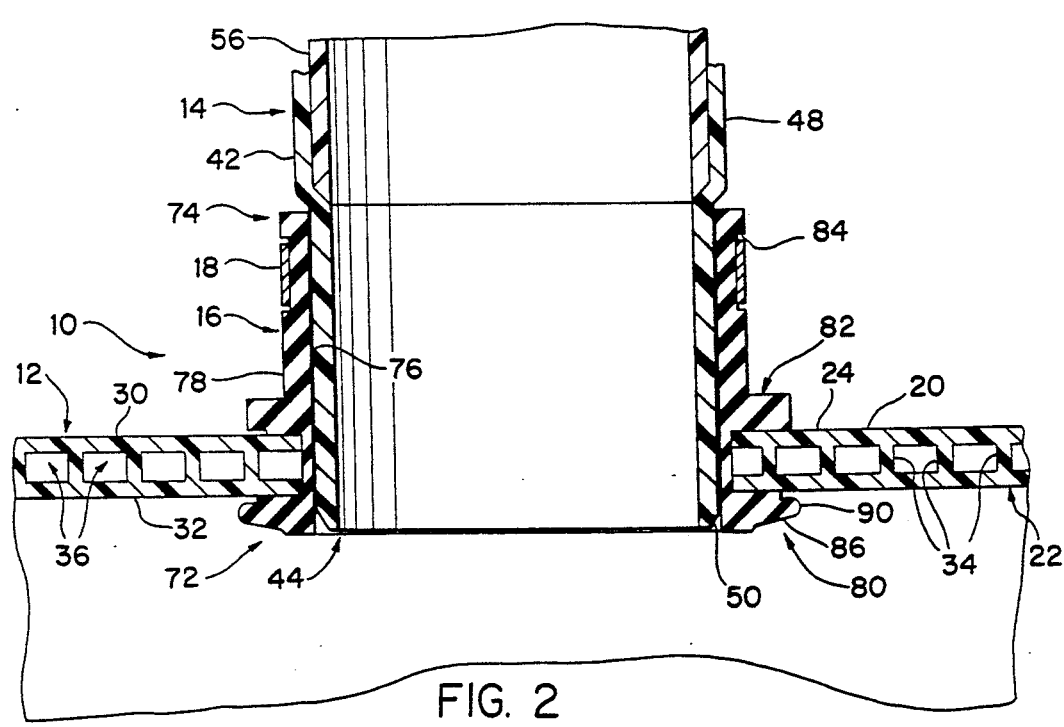
FIG. 2 is an enlarged, partial, cross-sectional view of the pipe connection assembly of FIG. 1.
Figure 3:
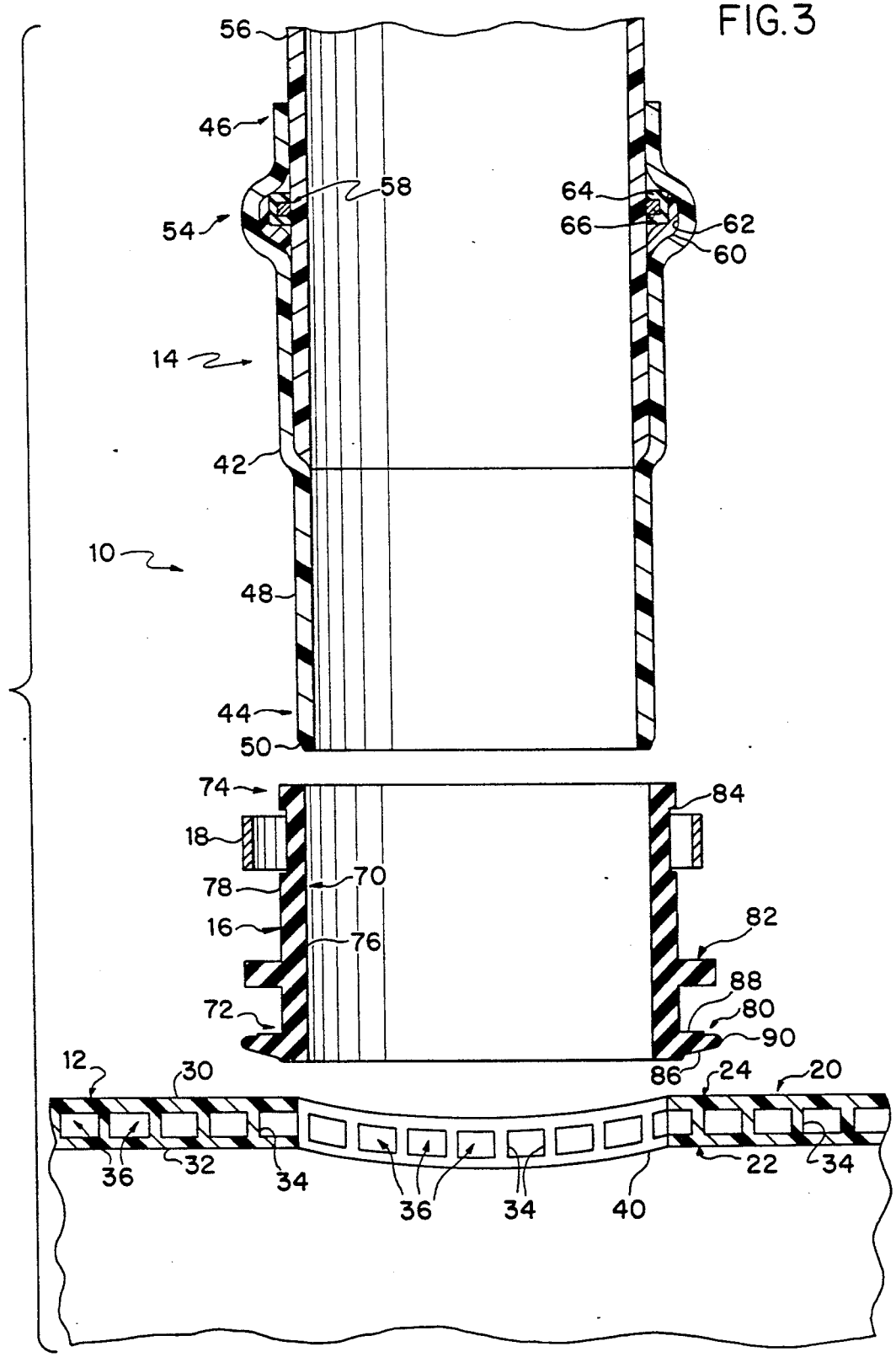
FIG. 3 is an enlarged, partial, exploded cross-sectional view of the pipe connection assembly of FIGS. 1 and 2.

Referring now to the drawings, a pipe connection assembly 10 is illustrated in FIGS. 1–3 in accordance with a first embodiment of the present invention, and includes a first or main sewer pipe 12, a second or branch sewer pipe 14 coupled to main sewer pipe 12, an elastomeric gasket 16 for sealing the connection between main pipe 12 and branch pipe 14, and a conventional pipe clamp 18 surrounding a portion of branch pipe 14 and gasket 16 for providing additional sealing therebetween.

Typically, main pipe 12 is buried below the surface of the ground. Branch pipe 14 is tapped into main pipe 12 and extends outwardly from main pipe 12, usually in perpendicular relation to longitudinal axis A of main pipe 12.

As particularly seen in FIGS. 1 and 3, main pipe 12 is a large diameter pipe having a cylindrical configuration and composed of a rigid thermoplastic synthetic resinous material, such as polyvinyl chloride, or other thermoplastic material commonly used in the formation of extruded pipe. Preferably, main pipe 12 is a PVC pipe manufactured by Vassallo and sold under the trademark VASSPIRAL.

As seen in FIG. 2, main pipe 12 has a substantially cylindrical, double-walled body 20 with a substantially cylindrical inner surface 22 and a substantially cylindrical outer surface 24. The inside diameter of main pipe 12 typically ranges from about 18 inches to about 48 inches, or even larger.

As seen in FIG. 2, double-walled body 20 has a substantially cylindrical outer wall 30, a substantially cylindrical inner wall 32 and at least one rib member 34 concentrically connecting outer and inner walls 30 and 32 together about the longitudinal axis A of main pipe 12. Preferably, a plurality of rib members 34 are utilized to connect outer wall 30 to inner wall 32. Rib members 34 together with outer and inner walls 30 and 32 define peripheral channels 36. Preferably, rib members 34 run helically or spirally between outer and inner walls 30 and 32.

It should be apparent to those skilled in the art that a single continuous rib member 34 running helically between outer and inner walls 30 and 32 can be utilized instead of a plurality of continuous helical rib members 34, thereby forming a single peripheral, helical channel 36. In other words, if a single rib member 34 is used, then a single helical channel is formed. However, if more than one rib member 34 is used, then a plurality of channels 36 are formed between outer and inner walls 30 and 32.

As seen in FIGS. 2 and 3 channels 36 are preferably rectangular. However, channels 36 can have other cross-sectional shapes as need or desired. For example, channels 36 could have a circular cross-section as disclosed in U.S. Pat. No. 3,917,500 to Petzetakis et al and U.S. Pat. No. 4,033,808 to Petzetakis, both of which are hereby incorporated herein by reference.

Double-walled body 20 has a substantially circular aperture 40 extending through outer and inner walls 30 and 32 and rib members 34 for receiving branch pipe 14 and gasket 16 therein. Aperture 40 can be formed in double-walled body 20 by drilling, punching, sawing, or by any other known methods. Aperture 40 intersects some of the channels 36, which creates a leakage problem. Accordingly, gasket 16 not only seals between pipes 12 and 14, but also seals the openings in the channels 36 formed by aperture 40.

Referring to FIG. 3, branch pipe 14 is a small diameter pipe having a substantially cylindrical configuration and composed of a rigid, thermoplastic synthetic resinous material such as polyvinyl chloride or other thermoplastic material commonly used int the formation of extruded or molded pipe. Branch pipe 14 has a tubular side wall 42 extending between a first end 44 and a second end 46.

First end 44 of branch pipe 14 has a substantially cylindrical portion 48 with its free end 50 bevelled. The outer diameter of cylindrical portion 48 is lightly greater than the inner diameter of aperture 40 in main pipe 12 minus the thickness of elastomeric waste 16. Accordingly, insertion o ranch pipe 14 into gasket 16 will expand and compress waste 16 radially outwardly into intimate contact with the portions of outer and inner walls 30 and 32 and rib members 34, which together define aperture 40 for sealing between pipes 12 and 14. Also, gasket 16 will seal the openings in channels 36 which intersect with aperture 40 for preventing liquid from leaking out of the pipes an into channels 36.

Second nd 46 of branch pipe 14 has an expanded or belled portion 54 which forms a socket for receiving a plastic pipe 56 therein. Expanded or belled portion 54 of pipe 14 is provided with a sealing gasket assembly 58 for sealing between pipes 14 and 56.

Sealing gasket assembly 58 includes a high impact gasket holding ring 60 circularly seated in an annular gasket groove 62 of pipe 14, an annular double lipped gasket 64 circularly seated in gasket holding ring 60, and a high impact retaining ring 66 circularly seated in double lipped gasket 64.

The sealing gasket assembly 58 is more particularly described in U.S. Pat. No.: 4,625,383 to Vassallo et al; 4,637,618 to Valls; and 4,826,028 to Vassallo et al, which are hereby incorporated herein by reference. Accordingly, sealing gasket assembly 58 will not be disclosed or illustrated in detail herein.

As particularly seen in FIG. 3, gasket 16 is tubular and composed of a suitable resilient, elastomeric material such as various rubbers, for example, styrene-butadiene copolymer, neoprene, butyl rubber, nitrile rubber, silicone rubber and the like. Gasket 16 has a substantially cylindrical body 70 having a first end 72 and a second end 74. A substantially cylindrical, smooth inner surface 76 and a substantially cylindrical outer surface 78 extend between first and second ends 72 and 74 to form a tubular body.

Inner surface 76 is substantially uniform in diameter with a diameter slightly smaller than the outer diameter of branch pipe 14 such that gasket 16 expands radially outwardly upon insertion of branch pipe 14 therein.

Outer surface 78 has a first annular flange 80 adjacent first end 72, a second annular flange 82 spaced axially between first and second ends 72 and 74, and an annular recess 84 adjacent second end 74 for receiving pipe clamp 18 therein. The region of gasket 16 between flanges 80 and 82 has a substantially uniform outer diameter and a substantially uniform thickness.

First annular flange 80 includes a sloping surface 86 extending outwardly from body 70 and sloping towards second end 74, an abutment surface 88 extending radially outwardly from body 70 and facing towards second end 74, and a curved tip portion 90 extending between sloping surface 86 and abutment surface 88.

Sloping surface 86 aids in the insertion of gasket 16 into aperture 40, while abutment surface 88 engages inner surface 22 of main pipe 12 for locating or positioning the first end 72 of gasket 16 in aperture 40.

Second annular flange 82 is axially spaced approximately the thickness of the double-walled body 20 from first annular flange 80. Accordingly, annular flanges 80 and 82 ensure that gasket 16 is properly fitted in aperture 40.

Pipe clamp 18 is preferably a stainless steel circumferential band clamp. Since pipe clamps, such as pipe clamp 18, are well known in the prior art, pipe clamp 18 will be discussed or illustrated in detail herein. Pipe clamp 18 is positioned around branch pipe 14 and gasket 16, and then tightened to compress second end 74 of gasket 16 against the outer surface of branch pipe 14. Preferably, pipe clamp 18 is received in annular recess 84 of gasket 16.

Assembly

Typically, main sewer pipe 12 is either an existing pipe buried underground or part of a new piping or sewage system. If main pipe 12 is buried underground, then the earth adjacent to main pipe 12 must be removed. However, it is unnecessary to completely remove the earth surrounding the circumference of the main pipe where the branch pipe will be connected. Rather, only a small area where the branch pipe 14 will be connected to main pipe 12 must be removed.

Next, aperture 40 is formed in the double-walled body 20 of main pipe 12 by conventional methods, such as drilling, cutting, or punching. Now, first end 72 of gasket 16 is inserted into aperture 40. Upon inserting gasket 16 into aperture 40, first annular flange 80 engages the edge of aperture 40, thereby compressing first end 72 of gasket 16 radially inwardly. More specifically, sloping surface 86 of flange 80 engages the edge of aperture 40. As gasket 16 is pushed axially into aperture 40, sloping surface 86 is forced radially inwardly to compress first end 72 of gasket 16.

After flange 80 passes through aperture 40, flange 80 will expand slightly radially outwardly until outer surface 78 of gasket 16 engages aperture 40. Gasket 16 is then pulled axially away from main pipe 12 until abutment surface 88 of flange 80 engages inner surface 22 of main pipe 12 and flange 82 rests on the outer surface 24 of main pipe 12 to correctly locate or position gasket 16 in aperture 40. In this position gasket 16 remains slightly compressed by the edge of aperture 40, since the outer diameter of gasket 16 is slightly larger than the inner diameter of aperture 40.

Now, either inner surface 76 of gasket 16 or outer surface of first end 44 of branch pipe 14 can be lubricated with a conventional lubricant, such as grease, for aiding insertion of branch pipe 14 into gasket 16. Branch pipe 14 is then driven into the bore of gasket 16, until the edge of first end 44 of branch pipe 14 is substantially aligned with the edge of first end 72 of gasket 16 as seen in FIG. 2. Insertion of branch pipe 14 into the bore of gasket 16 expands and compresses gasket 16 against the portions of outer wall 30, inner wall 32 and rib members 34, which together define aperture 40, for sealing between pipes 12 and 14 and the openings in peripheral channels 36 intersecting with aperture 40.

After branch pipe 14 is correctly positioned and driven into place, pipe clamp 18 is positioned in annular recess 84 of gasket 16, and then tightened to compress second end 74 of gasket 16 against the outer surface of branch pipe 14. Thus, the branch pipe 14 is prevented from being pulled out of aperture 40 as the earth settles, or if branch pipe 14 moves. Also, pipe clamp 18 provides additional sealing between gasket 16 and branch pipe 14 to prevent fluid from leaking out therebetween. Finally, pipe 56 is driven into second end 46 of branch pipe 14 to complete assembly.

Figure 4:
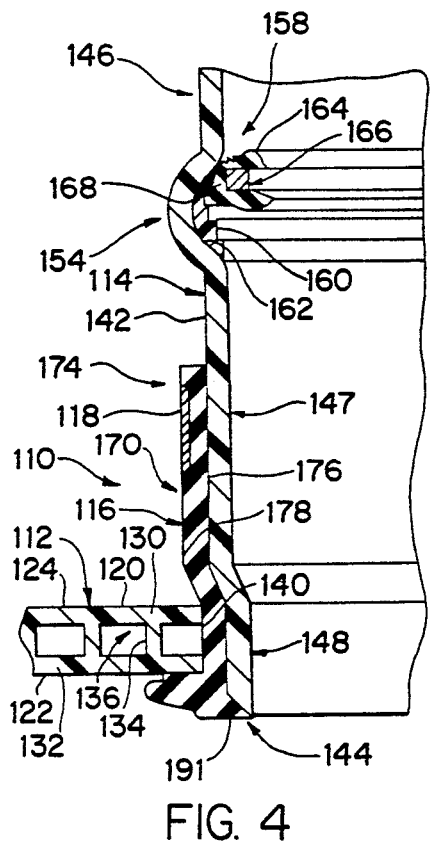
FIG. 4 is a partial, cross-sectional view of a second embodiment of a pipe connection assembly in accordance with the present invention.
Figure 5:
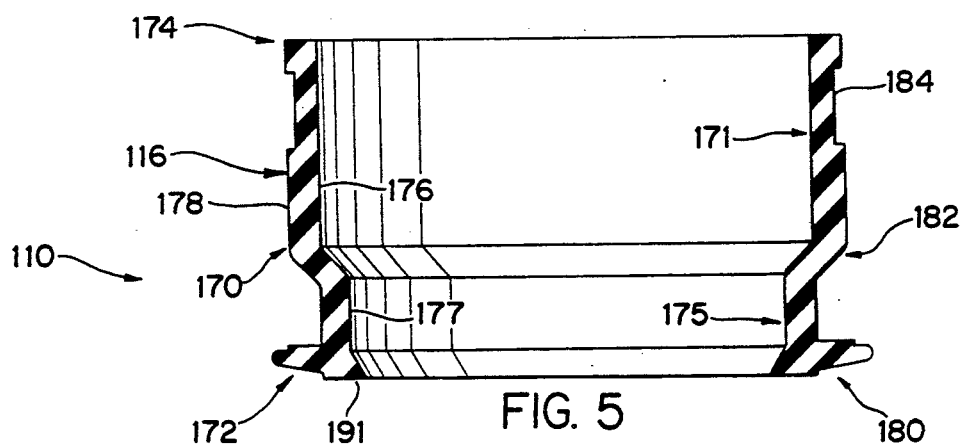
FIG. 5 is a cross-sectional view of the elastomeric gasket utilized in the second embodiment of the pipe connection assembly of FIG. 4.

FIGS. 4 and 5

Referring now to FIGS. 4 and 5, a pipe connection assembly 110 is illustrated in accordance with a second embodiment of the present invention, and includes a first or main sewer pipe 112, a second or branch sewer pipe 114 coupled to main sewer pipe 112, and elastomeric gasket 116 for sealing the connection between main pipe 112 and branch pipe 114, and a conventional pipe clamp 118 surrounding a portion of branch pipe 114 and gasket 116 for providing additional sealing therebetween.

First or main sewer pipe 112 is substantially identical to first or main sewer 12 as shown in FIG. 2, and therefore will not be discussed in detail.

As seen in FIG. 4, main pipe 112 has a substantially cylindrical, double-walled body 120 with a substantially cylindrical inner surface 122 and a substantially cylindrical outer surface 124. The inside diameter of main pipe 112 typically ranges from about 18 inches to about 48 inches, or even larger.

Preferably, a plurality of rib members 134 are utilized to connect outer wall 130 to inner wall 132. Rib members 134 together with outer and inner walls 130 and 132 define peripheral channels 136. Preferably, rib members 134 run helically or spirally between outer and inner walls 130 and 132.

Second or branch pipe 114 is substantially identical to branch pipe 14 as seen in FIG. 3, and therefore will not be discussed in detail.

Branch pipe 114 has a tubular side wall 142 with first and second cylindrical portions 147 and 148 extending between a first end 144 and a second end 146. The outer diameter of cylindrical portion 148 is slightly greater than the inner diameter of aperture 140 in main pipe 112 minus the thickness of elastomeric gasket 116. Accordingly, insertion of branch pipe 114 into gasket 116 will expand and compress gasket 116 radially outwardly into intimate contact with the portions of outer and inner walls 130 and 132 and rib members 134, which together define aperture 140 for sealing between pipes 112 and 114. Also, gasket 116 will seal the openings in channels 136 which intersect with aperture 140 for preventing liquid from leaking out of the pipes and into channels 136.

Second portion 147 of branch pipe 114 has an expanded or belled portion 154 which forms a socket for receiving a plastic pipe therein. Expanded or belled portion 154 of pipe 114 is provided with a sealing gasket assembly 158 for sealing between pipe 114 and a pipe inserted therein.

Sealing gasket assembly 158 includes a high impact gasket holding ring 160 circularly seated in an annular gasket groove 162 of pipe 114, an annular double lipped gasket 164 circularly seated in gasket holding ring 160 and a high impact retaining ring 166 circularly seated in double lipped gaskets 164.

The sealing gasket assembly 158 is more particularly described in U.S. Pat. Nos. 4,625,383 to Vassallo et al; 4,637,618 to Valls; and 4,826,028 to Vassallo et al, which are hereby incorporated herein by reference. Accordingly, sealing gasket assembly 158 will not be disclosed or illustrated in detail herein.

Gasket 116 is substantially identical to gasket 16, except that gasket 116 has been modified to include an inwardly angled surface 191 for engaging the inner end of pipe 114, and the second annular flange 82 of gasket 16 has been replaced by decreasing the diameter of a portion of gasket 116 as discussed below.

As particularly seen in FIG. 5, gasket 116 is tubular and composed of a suitable resilient, elastomeric material such as various rubbers, for example, styrene-butadiene copolymer, neoprene, butyl rubber, nitrile rubber, silicone rubber and the like. Gasket 116 has a substantially cylindrical body 170 having a first cylindrical portion 171 and a second cylindrical portion 175 with a transition zone 182 therebetween. A substantially cylindrical, smooth, first inner surface 176 along first portion 171, and a substantially cylindrical, second inner surface 177 along second portion 175.

First and second inner surfaces 176 and 177 are substantially uniform in diameter with their diameters being slightly smaller than the outer diameter of the first and second portions 147 and 148 of branch pipe 114, respectively, such that gasket 116 expands radially outwardly upon insertion of branch pipe 114 therein.

Pipe clamp 118 is preferably a stainless steel circumferential band clamp. Since pipe clamps, such as pipe clamp 118, are well known in the prior art, pipe clamp 118 will be discussed or illustrated in detail herein. Pipe clamp 118 is positioned around branch pipe 114 and gasket 116, and then tightened to compress second end 174 of gasket 116 against the outer surface of branch pipe 114. Preferably, pipe clamp 118 is received in annular recess 184 of gasket 116.

Figure 6:
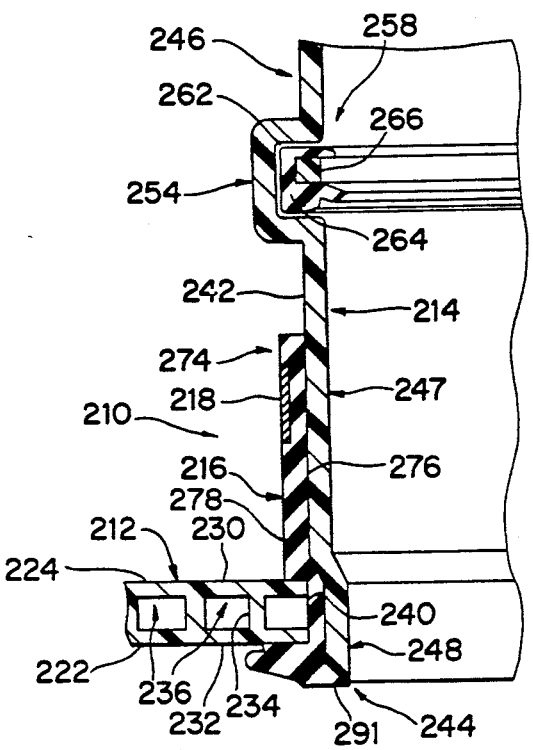
FIG. 6 is a partial, cross-sectional view of a third embodiment of a pipe connection assembly in accordance with the present invention.
Figure 7:
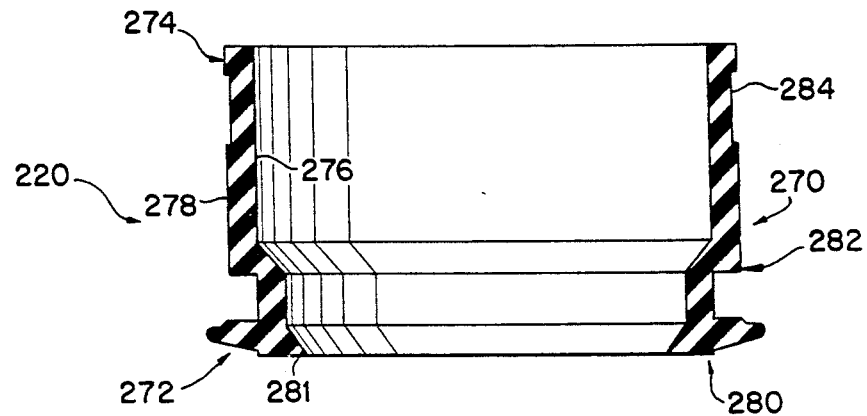
FIG. 7 is a cross-sectional view of the elastomeric gasket utilized in the third embodiment of the pipe connection assembly of FIG. 6.

FIGS. 6 and 7

Referring now to FIGS. 6 and 7, a pipe connection assembly 210 is illustrated in accordance with a third embodiment of the present invention, and includes a first or main sewer pipe 212, a second or branch sewer pipe 214 coupled to main sewer pipe 212, and elastomeric gasket 216 for sealing the connection between main pipe 212 and branch pipe 214, and a conventional pipe clamp 218 surrounding a portion of branch pipe 214 and gasket 216 for providing additional sealing therebetween.

First or main sewer pipe 212 is substantially identical to first or main sewer pipe 12, and therefore will not be discussed in detail.

As seen in FIG. 6, main pipe 212 has a substantially cylindrical, double-walled body 220 with a substantially cylindrical inner surface 222 and a substantially cylindrical outer surface 224. The inside diameter of main pipe 212 typically ranges from about 18 inches to about 48 inches, or even larger.

Preferably, a plurality of rib members 234 are utilized to connect outer wall 230 to inner wall 232. Rib members 234 together with outer and inner walls 230 and 232 define peripheral channels 236. Preferably, rib members 234 run helically or spirally between outer and inner walls 230 and 232.

Branch pipe 214 is substantially identical to branch pipe 14, and therefore will not be discussed in detail. The only difference between branch pipe 214 and branch pipe 14 is that the belled portion 54 has been modified to a sharp-cornered, C-shaped portion 254.

Branch pipe 214 has a tubular side wall 242 with first and second cylindrical portions 247 and 248 extending between a first end 244 and a second end 246. The outer diameter of cylindrical portion 248 is slightly greater than the inner diameter of aperture 240 in main pipe 212 minus the thickness of elastomeric gasket 216. Accordingly, insertion of branch pipe 214 into gasket 216 will expand and compress gasket 216 radially outwardly into intimate contact with the portions of outer and inner walls 230 and 232 and rib members 234, which together define aperture 240 for sealing between pipes 212 and 214. Also, gasket 216 will seal the openings in channels 236 which intersect with aperture 240 for preventing liquid from leaking out of the pipes and into channels 236.

Second portion 247 of branch pipe 214 has an expanded or belled portion 254 which forms a socket for receiving a plastic pipe therein. Expanded or belled portion 254 of pipe 214 is provided with a sealing gasket assembly 258 for sealing between pipe 214 and a pipe inserted therein.

Sealing gasket assembly 258 includes and annular double lipped gasket 264 circularly seated in an annular gasket groove 262, and a high impact retaining ring 266 circularly seated in double lipped gasket 264.

The sealing gasket assembly 258 is more particularly described in U.S. Pat. No. 4,579,354 to Vassallo, which is hereby incorporated herein by reference. Accordingly, sealing gasket assembly 258 will not be disclosed or illustrated in detail herein.

Gasket 216 is substantially identical to gasket 116, except that transition zone 281 has been modified to a sharp-cornered, annular shoulder 381 which engages the outer surface of main pipe 312.

As particularly seen in FIG. 7, gasket 216 is tubular and composed of a suitable resilient, elastomeric material such as various rubbers, for example, styrene-butadiene copolymer, neoprene, butyl rubber, nitrile rubber, silicone rubber and the like. Gasket 216 has a substantially cylindrical body 270 having a first cylindrical portion 271 and a second cylindrical portion 275 with a transition zone 282 therebetween. A substantially cylindrical, smooth, first inner surface 276 along first portion 271, and a substantially cylindrical, second inner surface 277 along second portion 275.

First and second inner surfaces 276 and 277 are substantially uniform in diameter with their diameters being slightly smaller than the outer diameter of the first and second portions 247 and 248 of branch pipe 214, respectively, such that gasket 216 expands radially outwardly upon insertion of branch pipe 214 therein.

Pipe clamp 218 is preferably a stainless steel circumferential band clamp. Since pipe clamps, such as pipe clamp 218, are well known in the prior art, pipe clamp 18 will be discussed or illustrated in detail herein. Pipe clamp 218 is positioned around branch pipe 214 and gasket 216, and then tightened to compress second end 274 of gasket 216 against the outer surface of branch pipe 214. Preferably, pipe clamp 218 is received in annular recess 284 of gasket 216.

FIG. 8

Figure 8:
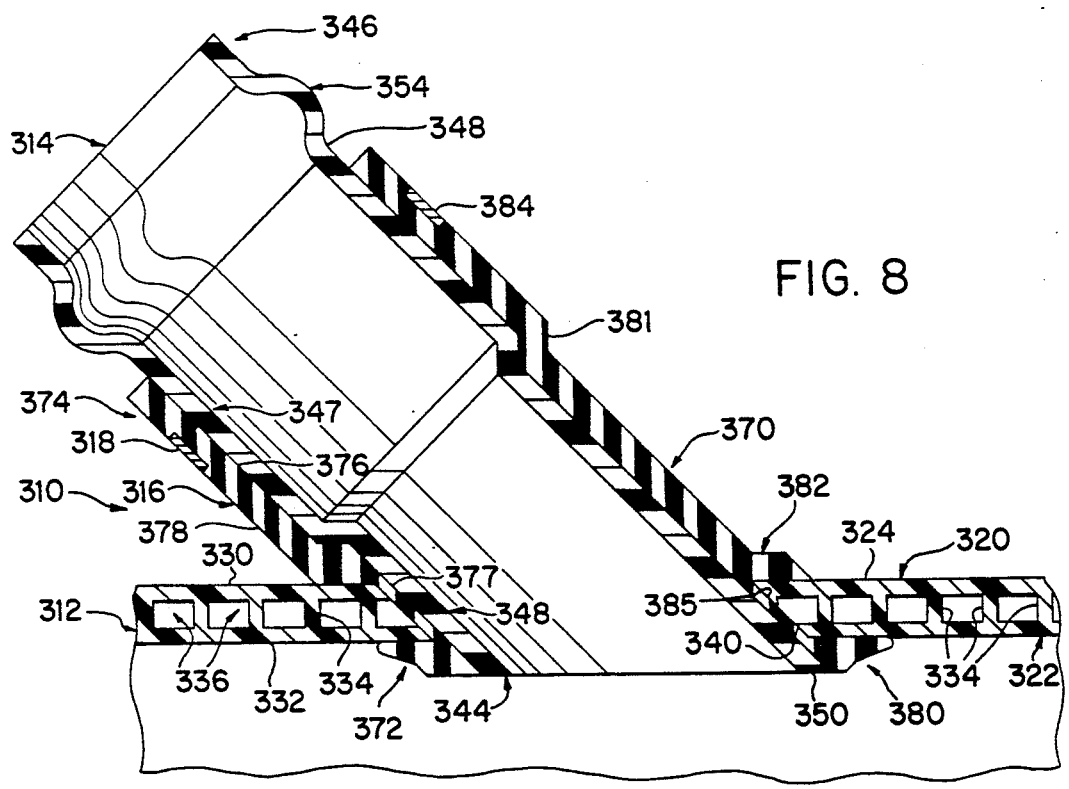
FIG. 8 is a partial, cross-sectional view of a fourth embodiment of a pipe connection assembly in accordance with the present invention, illustrating a branch pipe connected to a main pipe at about a 45° angle.

Referring now to FIG. 8, a pipe connection assembly 10 is illustrated in accordance with a third embodiment of the present invention, and includes a first or main sewer pipe 312, a second or branch sewer pipe 314 coupled to main sewer pipe 312, and elastomeric gasket 316 for sealing the connection between main pipe 312 and branch pipe 314, and a convention pipe clamp 318 surrounding a portion of branch pipe 314 and gasket 316 for providing additional sealing therebetween.

First or main sewer pipe 312 is substantially identical to first or main sewer pipe 12, and therefore will not be discussed in detail. The only difference between main sewer pipe 312 and main sewer pipe 12 is that the aperture 340 is formed with its longitudinal axis at about a 45° angle relative to the longitudinal axis of pipe 312 rather than at a 90° angle.

As seen in FIG. 8, main pipe 312 has a substantially cylindrical, double-walled body 320 with a substantially cylindrical inner surface 322 and a substantially cylindrical outer surface 324. The inside diameter of main pipe 312 typically ranges from about 18 inches to about 48 inches, or even larger.

Preferably, a plurality of rib members 334 are utilized to connect outer wall 330 to inner wall 332. Rib members 334 together with outer and inner walls 330 and 332 define peripheral channels 336. Preferably, rib members 334 run helically or spirally between outer and inner walls 330 and 332.

Branch pipe 314 is substantially identical to branch pipe 14, except that the lower end has been cut at about a 45° angle to its longitudinal axis. Thus, branch pipe 314 will not be discussed in detail.

Branch pipe 314 has a tubular side wall 342 with first and second cylindrical portions 347 and 348 extending between a first end 344 and a second end 346. The outer diameter of cylindrical portion 348 is slightly greater than the inner diameter of aperture 340 in main pipe 312 minus the thickness of elastomeric gasket 316. Accordingly, insertion of branch pipe 314 into gasket 316 will expand and compress gasket 316 radially outwardly into intimate contact with the portions of outer and inner walls 330 and 332 and rib members 334, which together define aperture 340 for sealing between pipes 312 and 314. Also, gasket 316 will seal the openings in channels 336 which intersect with aperture 340 for preventing liquid from leaking out of the pipes and into channels 336.

Second portion 347 of branch pipe 314 has an expanded or belled portion 354 which together form a socket for receiving a plastic pipe therein. Expanded or belled portion 354 of pipe 314 is provided with a sealing gasket assembly, such as sealing gasket assembly 58, for sealing between pipe 314 and a pipe inserted therein.

As particularly seen in FIG. 8, gasket 316 is tubular and composed of a suitable resilient, elastomeric material such as various rubbers, for example, styrene-butadiene copolymer, neoprene, butyl rubber, nitrile rubber, silicone rubber and the like. Gasket 316 has a substantially cylindrical body 370 having a first cylindrical portion 371 and a second cylindrical portion 375 with a transition zone 381 therebetween. A substantially cylindrical, smooth, first inner surface 376 along first portion 371, and a substantially cylindrical, second inner surface 377 along second portion 375.

First and second inner surfaces 376 and 377 are substantially uniform in diameter with their diameters being slightly smaller than the outer diameter of the first and second portions 347 and 348 of branch pipe 314, respectively, such that gasket 316 expands radially outwardly upon insertion of branch pipe 314 therein.

Gasket 318 has a first annular flange 380 adjacent first end 372, a second annular flange 382 spaced axially between first and second ends 372 and 374, and an annular recess 384 adjacent second end 374 for receiving pipe clamp 318 therein. The region 385 of gasket 316 between flanges 380 and 382 has a substantially uniform outer diameter and a substantially uniform thickness.

Annular flanges 380 and 382 are angled at about a 45° angle to the longitudinal axis of gasket 316. Annular flange 382 forms part of transition zone 381.

Second annular flange 382 is axially spaced approximately the thickness of the double-walled body 320 from first annular flange 380. Accordingly, annular flanges 380 and 382 ensure that gasket 316 is properly fitted in aperture 340.

Pipe clamp 318 is preferably a stainless steel circumferential band clamp. Since pipe clamps, such as pipe clamp 318, are well known in the prior art, pipe clamp 318 will be discussed or illustrated in detail herein. Pipe clamp 318 is positioned around branch pipe 314 and gasket 316, and then tightened to compress second end 374 of gasket 316 against the outer surface of branch pipe 314. Preferably, pipe clamp 318 is received in annular recess 384 of gasket 316.

Although the invention has been described with a certain degree of particularity, it is understood that the present disclosure has been made only by way of example and that numerous changes in the details of construction and the combination and the arrangement of parts may be resorted to without departing from the spirit and scope of the invention. Thus, the scope of the invention should not be limited by the foregoing specification, but rather, only by the scope of the claims appended hereto.

What is claimed is:

1. A pipe connection assembly, the combination comprising:

a first pipe having an inner cylindrical wall, an outer cylindrical wall, rib means for concentrically connecting said inner and outer walls together about a first longitudinal axis, and an aperture with an inner diameter extending through said inner and outer walls, said inner and outer walls and said rib means defining at least one peripheral channel being intersected by said aperture;

an elastomeric, tubular gasket having a substantially cylindrical body, a first end, a second end, a predetermined inner diameter and a predetermined outer diameter, said first end of said gasket being positioned in said aperture; and a second pipe having a substantially cylindrical side wall with an outer diameter slightly larger than said inner diameter of said aperture minus the thickness of said cylindrical body of said gasket, said second pipe being positioned in said gasket to compress said gasket against said inner and outer walls defining said aperture for sealing between said first and second pipes and said peripheral channel intersecting said aperture.

2. A pipe connection assembly according to claim 1, wherein
   said first and second pipes are composed of a plastic material.

3. A pipe connection assembly according to claim 2, wherein
   said rib means run helically between said inner and outer walls.

4. A pipe connection assembly according to claim 1, wherein
   said inner diameter of said aperture is smaller than said outer diameter of said gasket.

5. A pipe connection assembly according to claim 1, wherein
   said gasket has a first annular flange located adjacent said first end of said gasket.

6. A pipe connection assembly according to claim 5, wherein
   said first annular flange has an annular surface sloping outwardly from said first end and sloping towards said second end.

7. A pipe connection assembly according to claim 6, wherein
   said gasket has a second annular flange axially spaced between said first annular flange and said second end of said gasket.

8. A pipe connection assembly according to claim 7, further comprising
   a circumferential pipe clamp surrounding said second pipe and said gasket adjacent said second end.

9. A pipe connection assembly according to claim 1, wherein
   said cylindrical body of said gasket positioned in said aperture has a portion of uniform thickness engaging said inner and outer walls defining said aperture.

10. A pipe connection assembly according to claim 1, wherein
    said second pipe is coupled to said first pipe at about a forty-five degree angle.

11. A pipe connection assembly according to claim 1, wherein
    said second pipe is coupled to said first pipe at about a ninety degree angle.

12. A method of connecting a pair of pipes together, comprising the steps of providing a first pipe having an inner cylindrical wall, an outer cylindrical wall, and rib means for concentrically connecting said inner and outer cylindrical walls about a first longitudinal axis, said inner and outer walls and said rib means defining at least one peripheral channel;

cutting an aperture extending through said inner and outer cylindrical walls and said rib means, said aperture having a predetermined inner diameter;

inserting an elastomeric, tubular gasket having a substantially cylindrical body into said aperture; and inserting a second pipe having a substantially cylindrical side wall into said tubular gasket, positioned in said aperture, to compress said tubular gasket against said inner and outer walls for sealing between said first and second pipes and said peripheral channel intersecting said aperture.

13. A method according to claim 12, wherein the step of inserting said gasket into said aperture includes the step of radially compressing a first end of said gasket inwardly for inserting said first end of said gasket into said aperture such that said first end of said gasket remains partially compressed inwardly by said aperture.

14. A method according to claim 13, further comprising the step of
    providing an annular flange adjacent said first end of said gasket for locating said gasket in said aperture.

15. A method according o claim 14, further comprising the step of
    providing said annular flange with an annular surface sloping outwardly, away from said first end.

16. A method according o claim 14, further comprising the step of
    providing a circumferential pipe clamp around said gasket and said second pipe for additional sealing therebetween.

17. A method according to claim 12, wherein
    said first and second pipes are composed of a plastic material.

18. A method according t claim 12, further comprising the step of
    applying a lubricant onto said second pipe for aiding insertion of said second pipe into said gasket.

19. A method according to claim 12, further comprising the step of
    applying a lubricant onto an inner surface of said gasket for aiding insertion of said second pipe therein.

20. A pipe connection assembly, the combination comprising:
    a first pipe having an inner cylindrical wall with an outer peripheral surface, rib means, coupled to said outer peripheral surface of said inner wall, for reinforcing said first pipe, and an aperture with an inner diameter extending through said inner wall, said inner wall and said rib means defining at least one peripheral channel being intersected by said aperture;

an elastomeric, tubular gasket having a substantially cylindrical body, a first end, a second end, a predetermined inner diameter and a predetermined outer diameter, said first end of said gasket being positioned in said aperture; and a second pipe having a substantially cylindrical side wall with an outer diameter slightly larger than said inner diameter of said aperture minus the thickness of said cylindrical body of said gasket, said second pipe being positioned in said gasket to compress said gasket against said inner wall defining said aperture for sealing between said first and second pipes and said peripheral channel intersecting said aperture.

21. A pipe connection assembly according to claim 20, wherein
said cylindrical body has a substantially smooth, cylindrical inner surface.

22. A pipe connection assembly according to claim 20, wherein
said cylindrical body has a first cylindrical portion and second cylindrical portion, said first portion having a larger diameter than said second portion.

23. A pipe connection assembly according to claim 22, wherein
said first pipe includes an outer cylindrical wall coupled to said rib means.

24. A pipe connection assembly according to claim 23, wherein
said second portion of said gasket having an axial length substantially equal to the thickness of said first pipe.

25. A pipe connection assembly according to claim 24, wherein
said first and second portions are coupled together by a transition zone forming a shoulder which engages said outer cylindrical wall.

26. A pipe connection assembly according to claim 23, wherein
said second pipe is coupled to said first pipe at about a forty-five degree angle.

* * * * *